UNITED STATES PATENT OFFICE.

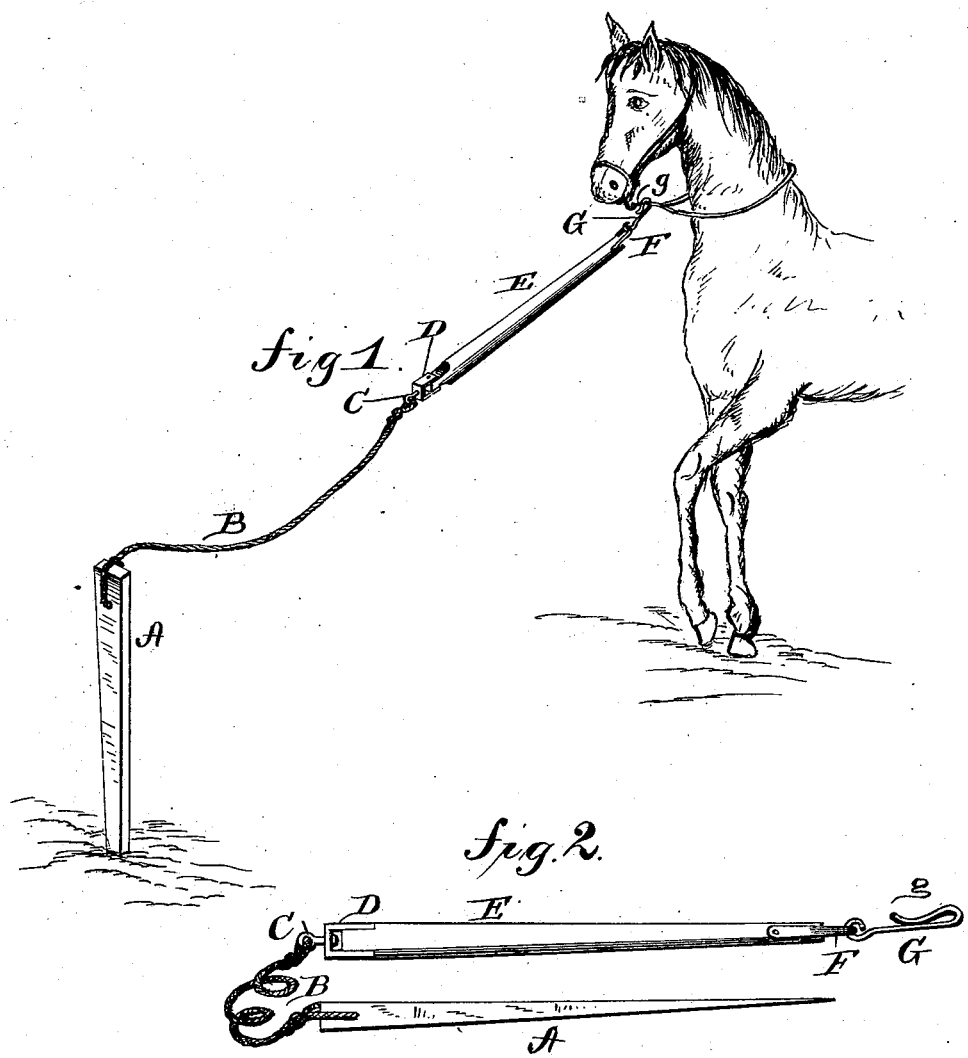

JOHN RODGER, OF UNION, SOUTH CAROLINA.

TETHER.

SPECIFICATION forming part of Letters Patent No. 236,091, dated December 28, 1880.

Application filed December 6, 1879.

*To all whom it may concern:*

Be it known that I, JOHN RODGER, of Union, in the county of Union and State of South Carolina, have invented certain new and useful Improvements in Horse-Tethers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to an improved device for tethering horses and other animals; and it has for its object to provide a means for securing the animal to a stake driven in the ground in such manner that the movements of the animal around the stake will not twist or tangle the tether rope or chain, as invariably happens when the animal is tethered by a simple rope or chain.

The invention further has for its object to provide an improved means for securing the animal to the tethering device, as more fully hereinafter specified.

To this end the invention consists in a portable tether consisting of a rod of wood or other suitable material provided at one end with a hasp having attached loosely to it a hook which may be secured to the halter of the animal, and at the other end with a clip, to which is swiveled a hook, to which the tether rope or chain is attached, the other end of said rope or chain being fastened to a tapering stake to be driven in the ground, as will be hereinafter more fully set forth, and pointed out in the claim.

In the drawings, Figure 1 is a representation showing a horse tethered by my improved device, and Fig. 2 a view of the tethering device.

The letter A indicates a stake constructed of wood or other suitable material, sharpened to a point at one end to facilitate driving. The letter B indicates the tether rope or chain, secured at one end to the upper end of the stake A. The letter C indicates a hook or loop, to which the other end of said rope or chain is secured, the said hook or loop having its shank swiveled to a clip, D, attached to one end of the rod E. The said rod is constructed of wood or other material, and has secured to the end opposite to the end to which the clip D is attached a hasp, F, to which is loosely secured a hook, G, which may be secured to the halter or other portion of the harness of the animal. The free end of the hook G is bent, as shown at $g$, the bent portion $g$ setting against the shank of the hook, so as to spring back against the same after the hook has been passed over the halter, and automatically lock the hook thereon.

I am aware that swiveled tethering devices have been heretofore used in connection with permanent hitching-posts, and this I do not claim, the essential feature of my invention consisting of a horse-tethering device that may be carried from place to place and used wherever required.

Having thus described my invention, what I claim, and desire to secure by Letters Patent, is—

The portable horse-tether hereinbefore described, consisting of the rigid bar E, having at its upper end the hasp F, with hook G, and at its lower end clip D, with swiveled hook C, rope B, and the tapering drive-stake A, as shown and described.

In testimony that I claim the foregoing I have hereunto set my hand this 25th day of November, 1879.

JOHN RODGER.

Witnesses:
DAVID JOHNSON, Jr.,
J. C. WALLACE.